C. H. CRAFT.
SPEEDOMETER DRIVE FOR AUTOMOBILES.
APPLICATION FILED OCT. 7, 1912.
1,134,591.
Patented Apr. 6, 1915.
2 SHEETS—SHEET 1.
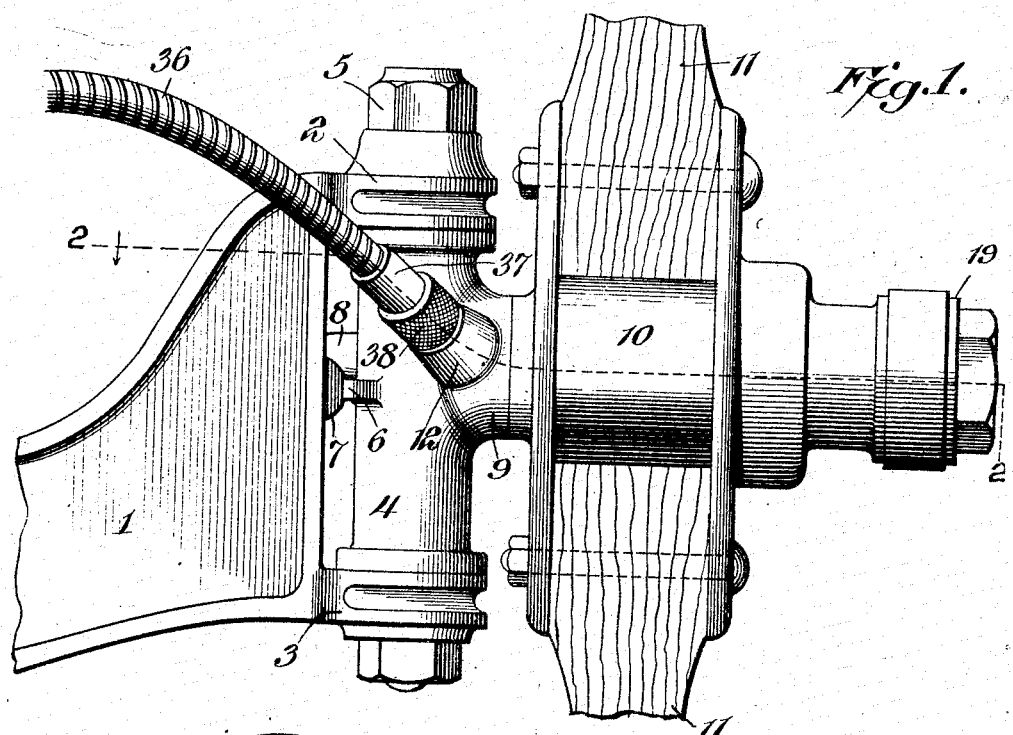
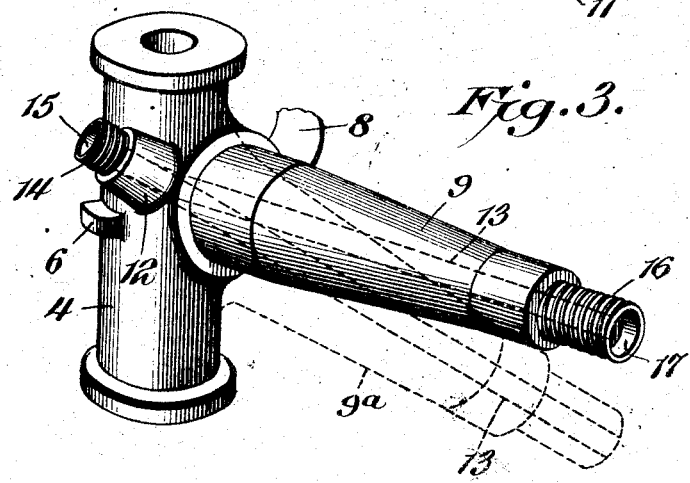
Clarence H. Craft, INVENTOR,
WITNESSES
Howard D. Orr,
F. T. Chapman
BY E. G. Siggers
ATTORNEY

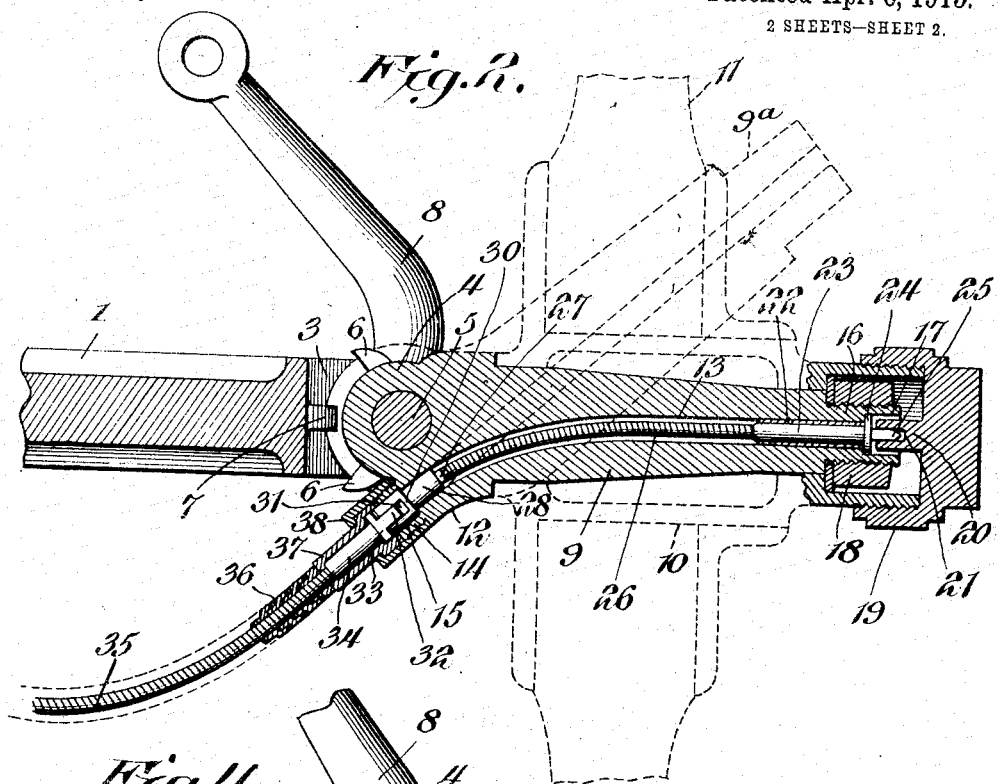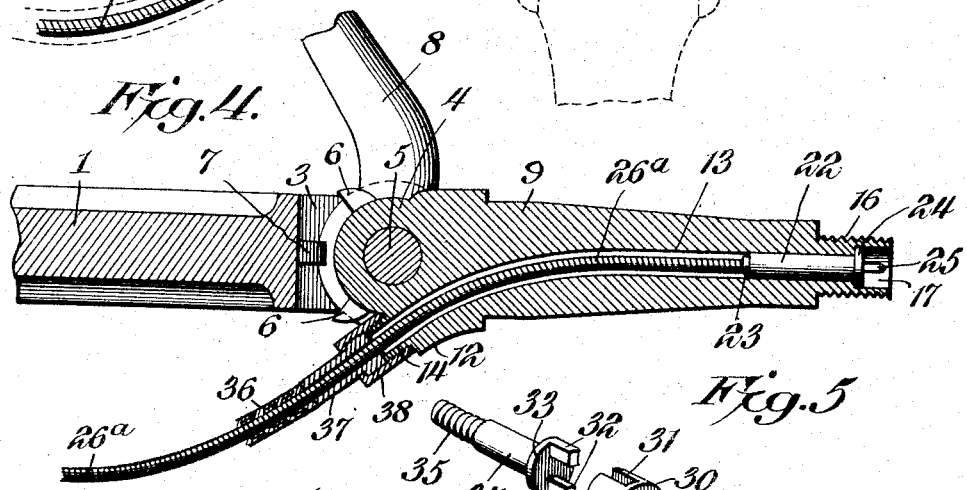

UNITED STATES PATENT OFFICE.

CLARENCE HORTON CRAFT, OF UNIONTOWN, PENNSYLVANIA, ASSIGNOR OF ONE-HALF TO FRED A. CLOSE.

SPEEDOMETER-DRIVE FOR AUTOMOBILES.

1,134,591.

Specification of Letters Patent.

Patented Apr. 6, 1915.

Application filed October 7, 1912. Serial No. 724,457.

*To all whom it may concern:*

Be it known that I, CLARENCE H. CRAFT, a citizen of the United States, residing at Uniontown, in the county of Fayette and State of Pennsylvania, have invented a new and useful Speedometer-Drive for Automobiles, of which the following is a specification.

This invention has reference to improvements in driving means for speedometers especially in connection with automobiles, although having an extent of use in other connections, as, for instance, for speed indicating mechanism for other moving devices than automobiles or for actuating other indicating structures than speedometers. Since, however, the invention is intended primarily for the actuation of a speedometer from one of the fore wheels of an automobile, the following description will be restricted to such use and arrangement without limiting the invention strictly thereto.

It is customary to place a speedometer on the dash of the automobile within ready view of the operator and such speedometer is almost universally actuated through a flexible shaft connected up with gearing, in turn driven by one of the fore or steering wheels of the vehicle, so that the rotating movement of such wheel will cause the actuation of the speedometer, while the flexible shaft permits the steering movements of the wheel without interference. The gearing usually employed, or such as has been from time to time proposed, is comparatively expensive to manufacture, especially in the case of cut gearing. Moreover, such gearing is constantly liable to injury and is subject to wear, since it is constantly exposed to accumulations of dust and dirt and sometimes to the destructive action of stones or other comparatively large articles lodging in the teeth of the gearing.

By the present invention not only is the first cost of the structure very materially reduced, but the liability of wear or injury such as found in exposed gearing is wholly eliminated.

By the present invention all gearing between an automobile fore or steering wheel and the speedometer is wholly eliminated, and the drive is direct either by way of one continuous piece of flexible shafting, or by a plurality of coupled pieces of flexible shafting, it being customary to employ two such pieces.

By the present invention the steering knuckle and spindle is provided with a passageway which may in greater part be axially to the spindle, and is then continued through a connecting boss formed on the knuckle, and in this passageway there is lodged a flexible shaft having at one end a device by means of which the dust cap of the hub of the steering wheel carried by the spindle is connected to the flexible shaft. This flexible shaft need be only long enough to be continued to the boss on the knuckle, which boss is designed to receive a coupling holding the usual flexible envelop for the flexible shaft carried to the speedometer and under such circumstances that end of the flexible shaft connected by this envelop to the boss on the knuckle is provided with a coupling member joining a corresponding coupling member at that end of the short section of flexible shaft housed in the spindle and knuckle. By this means the knuckle may be disconnected from the axle without disturbing the connections between the speedometer and the steering wheel further than uncoupling the two parts of the flexible shaft by the uncoupling of the envelop from the boss on the knuckle. Where the flexible shaft continues in one piece through the spindle, knuckle and protecting envelop to the speedometer, a greater amount of dismantling is required, if it be desired to remove the wheel spindle and knuckle from the axle. In either case the transmission is direct and gearless from the steering wheel to the speedometer and the driving parts are entirely inclosed in a practically dustproof passage, so that wear from foreign matter finding access to the parts is practically eliminated.

The invention will be best understood from a consideration of the following detailed description taken in connection with the accompanying drawings forming a part of this specification, with the further understanding that while practical forms of the invention are illustrated in the drawings, the said invention is susceptible of other practical embodiments, wherefore it is not limited to any exact conformity with the showing of the drawings but may be changed and modified so long as such changes and modifications mark no material departure from the salient features of the invention.

In the drawings:—Figure 1 is an elevation of the steering knuckle and a portion of the hub of one of the steering wheels with the invention applied. Fig. 2 is a section on the line 2—2 of Fig. 1. Fig. 3 is a perspective view of the steering knuckle and spindle removed from the axle; Fig. 4 is a section similar to Fig. 2, but showing a modified form of the invention. Fig. 5 is a displayed perspective view of the coupling means for connecting a flexible shaft limited to the spindle and knuckle to a continuing flexible shaft extending to the speedometer. Fig. 6 is an elevation of the dust cap looking into the same from the rear.

Referring to the drawings, there is shown kReferring to the drawings, there is shown a portion of an axle 1 such as is customarily employed as the front axle of an automobile. This axle is shown as of standard form, but such form may be varied in different ways without affecting the present invention, since the invention has nothing to do with the type of axle employed. In the structure shown the axle terminates in spaced bearings 2, 3 for a steering knuckle 4, which so far as its shape is concerned may follow the usual practice, and a bolt 5 traverses the bearings 2 and 3 and knuckle 4 to hold the knuckle in place and permit such rocking movement thereof as is found necessary in the operation of steering. It is customary to limit the movements of the knuckle about its axle support to definite extents, and this may be done by lugs 6 on the knuckle arranged to engage a lug 7 on the axle. Moreover, the knuckle is provided with an operating arm 8, so that it may be turned upon its pivot support or axis by mechanism such as is customarily employed in automobiles, such mechanism extending to the steering wheel. Moreover, the knuckle 4 has projecting therefrom about at a point midway between its two ends a spindle 9 designed to receive a hub 10 carrying spokes 11 forming the spokes of one of the steering wheels.

The parts so far described are such as are found upon many types of automobiles, and may be taken as typical of parts having like functions in all types of automobiles. It may be stated that while in some automobiles the arms 8 project as indicated in Fig. 2, which is toward the front of the vehicle, in other automobiles the arm 8 projects toward the rear, and in Fig. 2 the arm 8 is shown as extending toward the front simply for convenience of illustration, since it might be otherwise confused with parts to be described if extended toward the rear.

On one side of the knuckle 4 adjacent the point of its connection with the spindle 9 there is formed on the knuckle a boss 12 which when the knuckle and spindle are in place upon an automobile projects upwardly or downwardly and rearwardly at an angle to the longitudinal axis of the spindle. Extending longitudinally through the spindle from the outer end thereof toward its connection with the knuckle is an axial bore 13 of appropriate size, say about one-quarter of an inch, although any particular size is not obligatory. The bore 13 then extends by a gentle curve to and through the boss 12 which latter at the outer end is reduced in external diameter and there formed into a screw threaded nipple 14 having its interior counterbored, as indicated at 15, to a larger diameter than the bore 13. The outer end of the spindle 9 is prolonged as an externally threaded nipple 16, axially through which the bore 13 extends, and at the outer end this nipple 16 is counterbored, as indicated at 17, to a larger diameter than the bore 13. The nipple 16 is designed to receive the usual nut 18 and the hub is exteriorly threaded for the application of a dust cap 19, which dust cap in general construction may follow the usual practice, but on the inner face of the dust cap at the center thereof there is formed an axially projecting stud 20, or this stud may be made fast to the dust cap in any suitable way, while the end of the stud remote from its point of connection with the dust cap is formed with an entering slot 21, so that the free end of the stud is in effect bifurcated.

That end of the bore 13 opening into the counterbore 17 may have a bushing 22 applied thereto, in which bushing there is mounted a stem 23 terminating at one end in an expanded head 24 adapted to the counterbore 17 and projecting centrally from this head is a tongue 25 of a size to take into the slot 21 in the stud 20, so that when the parts are assembled the rotation of the dust cap 19 with the steering wheel will cause a like rotation of the stem 23 through the connection formed by the entering of the tongue 25 in the slot 21 of the stud 20.

Connected to that end of the stem 23 remote from the head 24 is one end of a flexible shaft 26 which may be in the form of a helical spring of suitable size, such as is customarily employed in flexible shafting used in connection with speedometers and the like. In the form of the invention illustrated in Figs. 1 and 2 the flexible shafting is shorter than the length of the bore 13 and at the end remote from the stem 23 carries a block 27, best shown in Fig. 5. This block is of non-circular contour and is preferably rectangular in cross section. There is provided a socket member 28 adapted to the bore 13 immediately adjacent the counterbore 15, and this socket member has a socket 29 for the reception of the block or plug 27. The socket member 28 is formed at one end with a head 30 adapted to the counterbore 15 and this head has an entering slot 31 adapted to receive diametrically spaced fingers 32 on a head 33 carried by one end of a stem 34 to which is attached one end of a flexible shaft 35, which latter may be of sufficient length to be connected up to a speedometer upon the dash of the automobile within ready view of the operator, but since such flexible shaft connection and speedometer are of common construction no showing of the speedometer has been made and only a short section of the shaft 35 is indicated in the drawings. The shaft 35 is inclosed in a flexible casing 36 as is customary, and this casing terminates in a coupling sleeve 37 shaped to receive the head 33 and stem 34, while a rotatable coupling member 38 is carried by the stem 37 and is made of suitable dimensions to engage the nipple 14 of the boss 12. When the parts are so coupled up the fingers 32 enter the slot 31, so that the socket member 28 and shaft 35 are connected for simultaneous rotation. To allow for some variations in the length of the bore 13 and counterbores 15 and 17 the socket receptacle 29 of the socket member 28 may extend completely therethrough and through the head 31, so that under some circumstances the block or plug 27 may extend between the fingers 32 without interference.

In Fig. 4 the stem 23 has a flexible shaft 26ª connected thereto and of a length to extend to the speedometer. The only difference between the form shown in Fig. 4 and that shown in Fig. 2 is that the coupling between the shafts 35 and 26 is omitted, and the shaft 26ª is of sufficient length to take the place of the shaft 35. The modification shown in Fig. 4 while exhibiting less parts has not the advantage of ready dismantling of the structure shown in Fig. 2, and hence the structure of Fig. 2 has certain advantages over that of Fig. 4.

It is customary to form the knuckles and spindles as one integral forging, and while the parts are being subjected to the forming operation, the spindle may be related to the knuckle somewhat as indicated in dotted lines at 9ª in Figs. 2 and 3, so that the boss 14 and spindle 9 are then in line one with the other and the bore 13 may be produced by a straight drilling tool of appropriate size. After such bore is produced the parts may be again treated to the forging operation to bring a spindle 9 into the desired relation to the knuckle 4, and under these circumstances it will be found that the bore 13 has assumed an appropriately gentle curvature within the spindle and knuckle, so that no sharp turns are present to interfere with the proper operation of the flexible shaft 26 and the latter may be installed in the spindle and boss 12 in a manner to operate advantageously, and at the same time be free from liability of contamination with dust and dirt and the wear incident to the presence thereof. Moreover, all gears or trains of gears are avoided and the expense incident to their production and mounting is eliminated.

The present invention may be installed upon an automobile at but a small fraction of the cost of speedometer drive mechanisms now almost universally employed, while the cost of upkeep is reduced to practically nothing so far as the effects of wear are concerned.

What is claimed is:—

1. A gearless speedometer drive for automobiles comprising a steering wheel knuckle or support and a spindle provided with a passage extending from the outer end of the spindle through the same and through one side of the knuckle or support, a flexible shaft structure extending through the passageway in the spindle and knuckle or support, and means for connecting the flexible shaft to a steering wheel on the spindle.

2. A means for transmitting motion from a steering wheel of an automobile to a speedometer mounted on the automobile comprising a spindle for the steering wheel and a knuckle or support therefor, said spindle having a passage extending longitudinally therethrough and continued into the knuckle or support and out one side thereof, a flexible shaft extending through said passage, and a dust cap for the steering wheel having a coupling member for connecting the wheel to the flexible shaft.

3. In means for transmitting motion from a steering wheel of an automobile to a speedometer, a wheel spindle and knuckle or support therefor provided with a passage extending through the spindle and out at one side through the knuckle or support between the ends thereof, and a flexible transmission shaft housed in said passage.

4. In a means for transmitting motion from a steering wheel of an automobile to a speedometer, a spindle for the wheel and a knuckle or support for said spindle having a curved passage extending through the spindle and out at one side of the knuckle or support, and a flexible shaft housed in said passage.

5. In a means for transmitting motion from a steering wheel of an automobile to a speedometer, a steering knuckle and wheel spindle carried thereby with a passage extending lengthwise through the spindle and out at one side of the knuckle, said passage having counterbored portions at the ends, a flexible shaft having a stem at one end provided with a head adapted to the counterbored portion of the passage at the same end and constructed for connection with an automobile wheel mounted on the spindle, and a coupling member seated in the counterbored portion of the passage at the other end thereof and provided with separable connections with the corresponding end of the flexible shaft.

6. A means for connecting a steering wheel of an automobile with a speedometer, comprising a steering knuckle and spindle thereon with a passage extending lengthwise of the spindle and out through one side of the knuckle, the knuckle being provided at the point of exit of the passage with an exteriorly threaded nipple, a flexible shaft seated in the passage and extending to the end thereof corresponding with the free end of the spindle and there provided with a coupling member, a coupling member adapted to an automobile wheel mounted on the spindle and connecting with the flexible shaft, and a flexible shaft casing having means for connection to the nipple at the side of the knuckle.

7. A means for the transmission of motion from a steering wheel of an automobile to a speedometer comprising a steering wheel knuckle and spindle having a bore extending through the spindle and out one side of the knuckle, and a flexible shaft adapted to seat in the bore, said flexible shaft having a coupling member at one end and a removable coupling at the other end.

8. A means for the transmission of motion from a steering wheel of an automobile to a speedometer comprising a steering wheel knuckle and spindle having a bore extending through the spindle and out one side of the knuckle, and a flexible shaft adapted to seat in the bore, said flexible shaft having a coupling member at one end and a removable coupling at the other end, the bore through the spindle and knuckle terminating in counterbored portions of larger diameter and the coupling members being each provided with a head adapted to seat in the respective counterbore, and said heads having means for connection with the wheel and with the speedometer, respectively.

9. A means for transmitting motion from a steering wheel of an automobile to a speedometer comprising a steering knuckle and spindle support for the wheel, the spindle and knuckle having a passage extending in part axially through the spindle from the free end thereof and then curved and opening through one side of the knuckle and there provided with a threaded nipple, the terminal ends of the bore being counterbored, a flexible shaft mounted in the bore and having terminal coupling portions mounted in the counterbored ends of the bore, one coupling member being separable from the shaft, a dust cap for the steering wheel having a coupling member adapted to the corresponding coupling member of the flexible shaft housed in the spindle, and a flexible shaft adapted to extend to the speedometer and provided with a protecting flexible casing having a coupling adapted to the threaded nipple at the side of the knuckle, and the second named flexible shaft having means for coupling it to the coupling at the corresponding end of the first-named flexible shaft.

10. In operating mechanism of the character described, the combination of an axle spindle having a longitudinal bore, said bore being diverted laterally from the axis of the spindle and opening at its rear end laterally from the axis of the spindle, a hub, a flexible shaft entering the bore and extending rearwardly, and means for connecting the outer end of the flexible shaft with the end of the hub, so as to be rotated thereby to operate a speedometer, substantially as set forth.

11. The combination with an axle spindle having a longitudinal bore extending through the same, the rear end of the bore being curved, a hub mounted on the spindle, a shaft journaled in the spindle, and means for connecting the outer end of the shaft with the hub so as to be rotated thereby, of a flexible shaft for operating the speedometer, having one of its ends attached to the shaft in the spindle at a point inside of the spindle whereby the flexible shaft rotates within the curved portion of the bore of the spindle, substantially as set forth.

In testimony, that I claim the foregoing as my own, I have hereto affixed my signature in the presence of two witnesses.

CLARENCE HORTON CRAFT.

Witnesses:
H. W. FRANKS,
EWING A. HIBBS.